(12) United States Patent
Okkel et al.

(10) Patent No.: US 11,453,748 B2
(45) Date of Patent: Sep. 27, 2022

(54) AMINE FUNCTIONAL COMPOUND

(71) Applicant: BYK-Chemie GmbH, Wesel (DE)

(72) Inventors: Andreas Okkel, Wesel (DE); Irina Giebelhaus, Wesel (DE); Guillaume Wojciech Jaunky, Wesel (DE); Hans-Josef Teuwsen, Wesel (DE); Markus Lorenz, Wesel (DE); Anne Vogel, Wesel (DE); Jörg Bömer, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 305 days.

(21) Appl. No.: 16/635,839

(22) PCT Filed: Aug. 7, 2018

(86) PCT No.: PCT/EP2018/071404
§ 371 (c)(1),
(2) Date: Jan. 31, 2020

(87) PCT Pub. No.: WO2019/030230
PCT Pub. Date: Feb. 14, 2019

(65) Prior Publication Data
US 2020/0216694 A1    Jul. 9, 2020

(30) Foreign Application Priority Data
Aug. 8, 2017 (EP) .................................. 17185302

(51) Int. Cl.
| | |
|---|---|
| *C08G 65/26* | (2006.01) |
| *C08G 63/48* | (2006.01) |
| *C08G 63/685* | (2006.01) |
| *C09D 11/322* | (2014.01) |
| *C09D 11/326* | (2014.01) |
| *C09D 11/38* | (2014.01) |
| *C08G 65/327* | (2006.01) |
| *C08G 65/332* | (2006.01) |
| *C09D 167/08* | (2006.01) |
| *C09D 167/00* | (2006.01) |

(52) U.S. Cl.
CPC ......... *C08G 65/2615* (2013.01); *C08G 63/48* (2013.01); *C08G 63/6852* (2013.01); *C08G 65/2609* (2013.01); *C08G 65/2624* (2013.01); *C08G 65/327* (2013.01); *C08G 65/3322* (2013.01); *C09D 11/322* (2013.01); *C09D 11/326* (2013.01); *C09D 11/38* (2013.01); *C09D 167/00* (2013.01); *C09D 167/08* (2013.01)

(58) Field of Classification Search
CPC .............. C08G 63/48; C08G 63/6852; C08G 65/2615; C08G 65/2624; C09D 11/326; C09D 11/322; C09D 11/38; C09D 167/08; C09D 167/00
See application file for complete search history.

(56) References Cited

U.S. PATENT DOCUMENTS

| | | |
|---|---|---|
| 3,689,531 A | 9/1972 | Critchfield et al. |
| 4,777,195 A | 10/1988 | Hesse et al. |
| 4,795,796 A | 1/1989 | Haubennestel et al. |
| 6,111,054 A | 8/2000 | Haubennestel et al. |
| 7,312,260 B2 | 12/2007 | Krappe |
| 8,653,222 B2 | 2/2014 | Orth |
| 9,206,347 B2 | 12/2015 | Weerasooriya |
| 9,217,083 B2 | 12/2015 | Hans |
| 9,340,641 B2 | 5/2016 | Orth |
| 9,580,616 B2 | 2/2017 | Fornara et al. |
| 10,301,486 B2 | 5/2019 | GöBelt |
| 2003/0027873 A1 | 2/2003 | Thetford |
| 2005/0020735 A1 | 1/2005 | Krappe |
| 2006/0089426 A1 | 4/2006 | Haubennestel |
| 2012/0059088 A1 | 3/2012 | Hilfiger et al. |
| 2013/0231418 A1 | 9/2013 | Hilfiger |
| 2017/0190840 A1 | 7/2017 | Gobelt et al. |
| 2017/0233660 A1 | 8/2017 | Soane |

FOREIGN PATENT DOCUMENTS

| | | |
|---|---|---|
| EP | 0270126 A2 | 6/1988 |
| EP | 0893155 A1 | 1/1999 |
| EP | 1486524 | 12/2004 |
| EP | 1650246 | 4/2006 |
| EP | 1745104 | 1/2007 |
| JP | 2000512795 | 9/2000 |
| JP | 2009256583 | 11/2009 |

(Continued)

OTHER PUBLICATIONS

International Search Report and Written Opinion for International Application No. PCT/EP2018/071398 dated Sep. 14, 2018.
International Search Report and Written Opinion for International Application No. PCT/EP2018/071404 dated Sep. 14, 2018.
http://chrysler.org/the-history-of-art-in-colors-brown/#:~:text=Asphaltum%20is%20a%20pigment%20made,term%20was%20indistinguishable%20from%20'bitumen, May 27, 2020 (Year: 2020).

(Continued)

*Primary Examiner* — Patrick D Niland
(74) *Attorney, Agent, or Firm* — Fitch, Even, Tabin & Flannery LLP

(57) ABSTRACT

An amine functional compound comprising i. least one segment consisting of at least one ether unit E and at least one ester unit, wherein the ether units and ester units are connected by an ether link or by an ester link, and wherein the sum of the number of ether units and ester units is at least three, and wherein the ether units and ester units are arranged in random order, and ii. at least one amine group ii. selected from a tertiary amine group, a salt of a tertiary amine group and a quaternary ammonium group, wherein the at least one segment is covalently linked to a polymerization starter moiety comprising the at least one amine group ii.

10 Claims, No Drawings

(56) References Cited

FOREIGN PATENT DOCUMENTS

| | | |
|---|---|---|
| JP | 2011224562 | 11/2011 |
| WO | 9534593 A1 | 12/1995 |
| WO | 9719948 A1 | 6/1997 |
| WO | 9955763 A1 | 11/1999 |
| WO | 2008092687 | 8/2008 |
| WO | 2008116932 A1 | 10/2008 |
| WO | 2009081528 A1 | 7/2009 |
| WO | 2011070074 | 6/2011 |
| WO | 2012049186 | 4/2012 |
| WO | 2016059066 | 4/2016 |

OTHER PUBLICATIONS

Huntsman, "Technical Bulletin Jeffamine M-1000 Polyetheramine," pp. 1-2, copyright 2007 (Year: 2007).
Huntsman, "Technical Bulletin Jeffamine M-600 Polyetheramine," pp. 1-2, copyright 2008 (Year: 2008).

AMINE FUNCTIONAL COMPOUND

FIELD OF THE INVENTION

The invention relates to an amine functional compound, to the uses of the amine functional compound, to a composition comprising the amine functional compound and to a method for the production thereof.

BACKGROUND OF THE INVENTION

Wetting agents which are present in a liquid in dissolved or dispersed form, reduce the surface tension or the interfacial tension, and thus increase the wetting capacity of the liquid. In this way, wetting agents permit a surface to be readily wetted by a liquid.

Dispersants are suitable in general for stabilizing solid particles in binders, paints, coatings, pigment pastes, plastics and plastic blends, adhesives and sealing compounds, for reducing the viscosity of corresponding systems and for improving the flow properties.

High mechanical forces are necessary in order to be able to introduce solids into liquid media. It is customary to use dispersants to reduce the dispersing forces and to minimize the total energy input into the system, which is required for deflocculation of solid particles and thus also to minimize the dispersing time. Dispersants of this kind are surface-active substances of anionic, cationic and/or neutral structure. These substances, in a small amount, are either applied directly to the solid or are added to the dispersing medium. It is also known that, following complete deflocculation of the agglomerated solids into primary particles, after the dispersing operation, there are also instances of reagglomeration, thereby completely or partly nullifying the dispersing effort.

As a result of inadequate dispersion and/or reagglomeration, unwanted effects typically occur, such as color drift, an increase in viscosity in liquid systems and a loss of gloss in paints and coatings as well as a reduction in the mechanical strength and material homogeneity in plastics.

In practice, various types of compounds maybe considered for use as wetting agents and/or dispersants. This is due in particular to the fact that there exist a number of different types of systems, which are based in particular on a wide variety of binders with different particles to be dispersed, such as pigments, fillers and fibers. In connection with the dispersion of pigments and fillers dispersants may contain tertiary amine groups or derivatives thereof as functional groups to provide cationic functional dispersants.

US2017/0190840 describes polyamine addition compounds, methods for the production thereof, the use thereof as wetting agents and dispersing agents, and paints and plastic materials containing said addition compounds.

In view of the multiplicity of organic or inorganic pigments that are nowadays used, sufficient stabilization is not sufficiently ensured and therefore there is still a need to further improve the performance of the dispersant. In particular, dispersants comprising a polyester segment may suffer from a tendency to crystallization at low temperature, for example at 10° C. or lower. In particular, a polycaprolactone segment has a strong tendency to crystallization at low temperature. The dispersing ability of the dispersant may be negatively influenced due to the crystallization of the dispersant and the resulting dispersion may be prone to inadequate dispersion and/or reagglomeration. This may cause a color shift, a loss of gloss and/or an increase in viscosity of the dispersing system. Additionally, the handling, such as a dosing, of the dispersant itself may also be negatively influenced by a crystallization of the dispersant.

It is an object of the present invention, therefore, to eliminate the above-described disadvantages of known state of the art dispersants, in other words to develop dispersants that provide an effective stabilization of particles and in particular for dispersing pigments.

SUMMARY OF THE INVENTION

In a first aspect the invention provides an amine functional compound comprising i. least one segment consisting of at least one ether unit E and at least one ester unit, wherein the ether units and ester units are connected by an ether link or by an ester link, and wherein the sum of the number of ether units and ester units is at least three, and wherein the ether units and ester units are arranged in random order, and ii. at least one amine group ii. selected from a tertiary amine group, a salt of a tertiary amine group and a quaternary ammonium group, wherein the at least one segment is covalently linked to a polymerization starter moiety comprising the at least one amine group ii.

In a further aspect, the invention provides an amine functional compound comprising:

i. at least one segment consisting of at least one ether unit and at least one ester unit, which are connected to one another by an ether link or an ester link, wherein each segment is defined by the largest portion between two ester links and wherein the sum of the number of ether units and ester units is at least three, and wherein the at least one segment comprises an average number of ether links L between two adjacent ether units and an average number of ether units E, wherein a ratio R is defined according to formula (I):L/(E−1) and wherein, when E is larger than 1.0, R is smaller than 1.0, and, when E is equal to 1.0, L is larger than 0.0; and at least one amine group ii. selected from a tertiary amine group, a salt of a tertiary amine group and a quaternary ammonium group, wherein the at least one segment is covalently linked to a polymerization starter moiety comprising the at least one amine group ii.

The ether units (ia.) and ester units (ib.) of the at least one segment are connected to one another by an ether link or an ester link. The ether unit (ia.) may be formed by a ring-opening polymerization reaction of a cyclic ether monomer, such as an oxirane monomer or an oxetane monomer. The ester unit (ib.) may be formed by a ring-opening polymerization reaction of a cyclic ester monomer, such as a lactone monomer, e.g. epsilon-caprolactone. An ether link is defined as an oxy bond, i.e. —O—. An ether link may be formed between two adjacent ether units and may be formed between an ether unit and an ester unit at the hydroxyl end position of an ester monomer. An ester link is defined as a carboxylate ester bond:

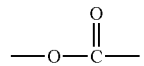

An ester link may be formed between two adjacent ester units and may be formed between an ether unit and an ester unit at the carboxylic acid end position of an ester monomer.

The at least one segment i. consists of at least one ether unit (ia.) and at least one ester unit (ib.), Each of the at least one segment i. has in total at least three units made up of at least one ether unit ia. and at least one ester unit ib. Thus, the average number of ether units E of the at least one segment is at least 1.0. In case E is equal to 1.0, L needs to be larger than 0.0. In case E is larger than 1.0, the ratio R is smaller than 1.0.

The sequence of ether units and ester units in the segment is a basic aspect of the present invention. It is generally possible to provide corresponding block structures of ether units and ester units on the one hand but on the other hand it is possible to generate structures in which the structural units are more or less randomly copolymerized into the segment (such as random copolymer type). According to the present invention the segment should provide sequences of ester units and ether units, wherein the average number of ether links L between two adjacent ether units and the ratio R are provided as a quantitative measure how randomly ester units and ether units are arranged in the segment.

The ratio R according to formula (I) is based on the understanding that an average number of ether links L between two adjacent ether units is related to the (statistical or non-statistical) change of alternating an ether unit by an ester unit along the sequence. In case the sequence is formed by a two-block structure of a polyether block and a polyester block, the average number of ether links between two adjacent ether units L will be equal to the sum of the average number of ether units E in the segment minus one ether unit (i.e. E−1). Thus, for the two-block structure of a polyether block and a polyester block the formula (I) is equal to 1.0 as L is equal to (E−1).

In case the segment has several sequences of ether units, which are interrupted by at least one ester unit, the average number of ether links L between two adjacent ether units will accordingly decrease, while the average number of ether units E in the segment may be held constant. As a result, the ratio R is accordingly below 1.0.
i.e. R=L/(E−1)<1.0.

When the ratio R is smaller than 1.0, the amine functional compound provides enhanced properties, such as enhanced dispersion ability as dispersant. In particular, a dispersing stability provided by the amine functional compound at lower temperature may be improved as it shows less tendency towards crystallization. The enhanced properties of the amine functional compound may be an enhanced color, enhanced gloss and/or reduction of viscosity of the dispersion when using the amine functional compound as dispersant. Additionally, the handling of the amine functional compound in an additive composition is easier due to its low tendency towards crystallization.

The Polymerization Starter Moiety.

The amine functional compound comprises a polymerization starter moiety. The polymerization starter moiety is a residue of a polymerization starter molecule used for starting the ring-opening polymerization of the ether units and the ester units to form the at least one segment i. The polymerization starter moiety comprises an amine group ii. The polymerization starter moiety is covalently linked to the at least one segment i. The polymerization starter molecule (i.e. of a polymerization starter compound) is covalently linked to the segment i. after a functional group of the polymerization starter molecule has started the addition reaction of ether units and ester units thereby forming said at least one segment i. Examples of a functional group of the polymerization starter molecule for starting the addition reaction are a hydroxyl group, a primary amine group and a secondary amine group.

The polymerization starter compound may be represented by the general formula (II): $Y(-X-H)_q$, wherein Y is represented by an organic group containing 1-500 carbon atoms, X is represented by O, NH and/or $NR^1$, and q=1–100. Normally $R^1$ is independently selected and is represented by a chemical bond to a carbon atom of Y and/or an independently selected organic group containing 1-20 carbon atoms.

In embodiments, the polymerization starter moiety is covalently linked to only one segment. In this embodiment, the polymerization starter molecule is typically monofunctional (q is 1) and able of forming one chain of a segment according to the invention only during a ring-opening polymerization reaction. In alternative embodiments, the polymerization starter moiety is covalently linked to more than one segment. In these embodiments, the polymerization starter molecule is multifunctional (q is larger than 1) and able of forming more than one chain (more than one segment according to the invention) due to a ring-opening polymerization reaction.

The amine functional compound may be represented by a general formula (III):
$Y(-X-W)_q$, wherein Y is represented as indicated above by an organic group containing 1-500 carbon atoms, X is represented as indicated above by O, NH and/or $NR^1$, q=1-100 and W is a segment according to the invention. Normally $R^1$ is independently selected and is represented by a chemical bond to a carbon atom of Y and/or an independently selected organic group containing 1-20 carbon atoms.

In this formula (III) of the amine functional compound, the polymerization starter moiety is represented by the structure Y—X. Thus, the polymerization starter moiety contains the group Y and the link X, which covalently connects the group Y to the segment W.

The at least one amine group ii. of the amine functional compound, which is suitably selected from a tertiary amine group, a salt of a tertiary amine group, and a quaternary ammonium group, provides functional groups for affinic binding to particles or fibers of a dispersion. Additionally, the at least one amine group ii. of the amine functional compound does not hinder or accelerate curing reactions of nucleophilic curable systems, such as epoxide systems.

Segment Units Order

In general, the more alternating the ether unit and the ester unit are arranged along the segment, the smaller the ratio R will be than 1.0 and closer the ratio R will be to 0.0.

Typically, in case a mixture of segments is present in the amine functional compound, wherein in each segment the average number of ether units E is equal to one another (e.g. 4.0 ether units) and the number of ether links L between two adjacent ether units is statistically distributed in the segments (i.e. between 0.0-3.0 when using 4.0 ether units), the ratio R will be substantially equal to 0.5.

Ultimately, in case each of the segments has a perfect alternating structure of ether units and ester units (e.g. ia.-ib.-ia.-ib-. structure), the average number of ether links L between two adjacent ether units is equal to 0.0 (as no ether links L are present). Thus, the ratio R for the perfect alternating structure is equal to 0.0.

In an exemplary embodiment, the at least one segment has a molar ratio between the ester units and the ether units in the range 19:1 to 1:1. A higher amount of ester units provides a good compatibility of the amine functional compound to a dispersion system comprising particles. Moreover, the segment structures with a higher amount of ester units and having the specific ratio R as defined by the formula (I) enhance the desired technical effect.

Preferably, the at least one segment has a molar ratio between the ester units and the ether units in the range 9:1 to 1:1.

In an exemplary embodiment, the number of unit links of an ether unit to an adjacent ester unit is at least two, preferably at least three. The higher the number of unit links of an ether unit to an adjacent ester, the more alternating the order of the ether units and the ester units is.

In an exemplary embodiment, the ratio R is smaller than 0.9, preferably R is smaller than 0.8, more preferably R is smaller than 0.7. The lower the ratio R, the more alternating the order of the ether units and the ester units is.

In an exemplary embodiment, the ratio R is substantially equal to 0.5. In this embodiment the ether units and ester units of the at least one segment are arranged in a random order. In case the ether units and ester units of the at least one segment are arranged in a random order, the ratio R will be substantially equal to 0.5. In case the molar ratio between the ether units and the ester units is equal to 1.0:1.0 and a chance of connecting an ester unit to an ether unit is substantially equal to the chance of connecting an ether unit to an ether unit during addition polymerization reaction of the segment, then the ratio R of the resulting segment is about 0.5. In particular, in this example a reaction rate for connecting an ester unit to an ether unit is substantially equal to a reaction rate for connecting an ether unit to an ether unit during addition polymerization reaction. In examples, by adjusting a molar ratio between the ether units and the ester units for the addition polymerization reaction of the segment, the ratio R of the segment may accordingly be tuned to be lower or higher than 0.5.

In an example, the ratio R is from 0.3 to 0.7, preferably the ratio R is from 0.4 to 0.6.

In an exemplary embodiment, the ratio R is substantially equal to 0.0. In this embodiment the ether units and the ester units of the at least one segment are arranged in a substantially alternating order. The ratio R is at least 0.0. In case molar ratio between the ether units and the ester units is 1:1 and the ether units and the ester units of the at least one segment are arranged in a perfect alternating order, the ratio R is equal to 0.0. Additionally, also in case an ether unit is always alternated by one or more ester units, independently of the molar ratio between the ether units and the ester units, the ratio R is equal to 0.0. In all of these embodiments, the number of ether links L between two adjacent ether units of the at least one segment is equal to 0.0.

In an example, the ratio R is from 0.0 to 0.1.

The Ether Units ia.

In exemplary embodiments the ether units are selected from the group consisting of the formula (IV) —[$CR^{30}_2$]$_n$—O—, wherein n is an integer of 2 or 3, and $R^{30}$ independent of each other represent organic groups having 1 to 25 carbon atoms or hydrogen.

The organic group of $R^{30}$ may be a connective group ~$R^{101}$—$CH_2$—O~ containing 1-25 carbons atoms, wherein $R^{101}$ is independently selected and is an optional group represented by an organic group containing 1-25 carbon atoms, In case $R^{30}$ is an connective group ~$R^{101}$—$CH_2$—O~, the ether unit may have three links to other ester units and/or ether units. In fact, the connective group provides the possibility of a third link to an ether unit or an ester unit additional to the two possible links of the ether unit at both ends of the ether unit according to formula (II). For example the connective group ~$R^{101}$—$CH_2$—O~ might be linked with another ether unit in order to form a structure element according to ~$R^{101}$—$CH_2$—O—[$CR^{30}_2$]$_n$—O—.

In case n is equal to 2, the ether unit is generated by the polymerization of a corresponding epoxy functional monomer. Suitable types or species are for example: aliphatic, cycloaliphatic, aromatic and/or araliphatic glycidyl ether, glycidyl ester and olefin oxides like $C_1$-$C_{20}$-alkyl glycidyl ether, phenyl glycidyl ether, cresyl glycidyl ether, naphthyl glycidyl ether, butyl glycidyl ether, p-tert.-butyl-phenyl glycidyl ether, 2-ethyl-hexyl glycidyl ether, $C_{12\text{-}o14}$-glycidyl ether, allyl glycidyl ether, 2,3-epoxypropylneodecanoate (Cardura® E 10, Resolution Performance Products), $C_4$-$C_{20}$-olefine oxides like 1,2-octene oxide, 1,2-nonene oxide, 1,2-undecene oxide, 1,2-dodecene oxide, 1,2-octadecene oxide, 4-methyl-1,2-pentene oxide, 1,2 butene oxide, propene oxide, ethylene oxide, styrene oxide, butadiene monoxide, isoprene monoxide, cyclopentene oxide and/or 2-ethyl-1,2-butene oxide.

In the case the ether unit contains the connective group ~$R^{101}$—$CH_2$—O~, this structural unit is derived from a corresponding epoxy functional monomer bearing at least one hydroxyl functional group, like for example glycidol.

In a particular embodiment, in case n is equal to 2, at least one of the $R^{30}$ represents an ether group having the formula —$R^{31}$—O—$R^{32}$, wherein $R^{31}$ and $R^{32}$ independent of each other represent organic groups having 1 to 30 carbon atoms. Suitable types or species are for example: aliphatic, cycloaliphatic, aromatic and/or araliphatic glycidyl ether, glycidyl ester and olefin oxides like $C_1$-$C_{20}$-alkyl glycidyl ether, phenyl glycidyl ether, cresyl glycidyl ether, naphthyl glycidyl ether, butyl glycidyl ether, p-tert.-butyl-phenyl glycidyl ether, 2-ethyl-hexyl glycidyl ether, $C_{12}$-$C_{14}$-glycidyl ether, allyl glycidyl ether. The ether units according to these embodiments further reduce a tendency towards crystallization of the segments.

In case n is equal to 3, the ether unit is generated by the polymerization of a corresponding oxetane-monomer. Suitable types or species are for example: non-substituted oxetane and its aliphatic, cycloaliphatic, aromatic and/or araliphatic derivatives like 3-ethyl-3-(phenoxymethyl) oxetane and, 3-ethyl-3-(2-ethylhexyloxymethyl)oxetane, 3,3-dipropyl oxetane, 3,3-diethyl oxetane, 3-ethyl-3-butyl oxetane, 3-butyl-3-methyl oxetane, 3-ethyl-3-methyl oxetane and ethylhexyl oxetane.

In the case the ether unit contains a connective group ~$R^{101}$—$CH_2$—O~, this structural unit is derived from a corresponding oxetane functional monomer bearing at least one hydroxyl functional group, like for example 3-ethyl-3-(hydroxymethyl)oxetane, 3-methyl-3-(hydroxymethyl) oxetane and its derivatives obtained by ethoxylation or propoxylation with 1-10 ethylene oxide and/or propylene oxide, which can be arranged in a statistical-, block- or gradient-structure.

The Ester Units ib.

The ester units ib. may be formed by a ring opening polymerization reaction of a cyclic ester, such as propiolactone, valerolactone, butyrolactone, caprolactone, such as epsilon-caprolactone and delta-valerolactone. Epsilon-caprolactone is a readily available caprolactone, which may react both with itself and with cyclic ethers in a ring opening polymerization reaction. Said ester units ib. are readily obtainable in a random order arrangement in conjunction with ether units.

In a preferred embodiment, the segment i. is formed by a ring opening polymerization reaction of epsilon-caprolactone and a cyclic ether.

Amine Group ii.

In the invention, the polymerization starter moiety of the amine functional compound comprises the at least one amine group ii.

In particular examples, useful for the preparation of the amine functional compound according to the present invention is a polymerization starter compound comprising a tertiary amine group, or a polymerization starter compound comprising a primary amine group, or a polymerization starter compound comprising a secondary amine group or a polymerization starter compound comprising a combination of a tertiary amine group, a primary amine group and a secondary amine group.

In particular examples, a tertiary amine group is contained in the structure of the polymerization starter molecule already. Thus, in the formula (II) the tertiary amine group is contained in the group Y. In these examples, the polymerization starter molecule provides at least one of the amine group ii. in the form of a tertiary amine group. Optionally the tertiary amine group may be converted to a salt thereof or may be quaternized. The conversion is preferably carried out after forming of the segments i. In these examples, the tertiairy amine group is already contained in the molecule structure of the polymerization starter compound itself. Examples are amino functional compounds having tertiary amines and hydroxyl functional compounds having tertiary amines.

Examples of a polymerization starter compound having a tertiary amine group have the general formula:

$$R^2R^3N\text{---}R^4\text{---}(XH)_n \qquad (V)$$

Wherein $R^2$, $R^3$, $R^4$ are organic groups, optionally containing another tertiary amine. n is an integer of at least 1

X is represented by O, NH and/or $NR^1$. Normally $R^1$ is independently selected and is represented by a chemical bond to a carbon atom of Y and/or an independently selected organic group containing 1-20 carbon atoms.

Regarding tertiary amines which may be contained in Y of the polymerization starter compound according to formula (II):

Hydroxy functional compounds having tertiary amines may also function as $Y(\text{---}O\text{---}H)_q$. Examples of appropriate hydroxyl functional compounds having tertiary amines are 2-dimethylamino ethanol, 2-diethylamino ethanol, 3-dimethylamino propanol, 3-diethylamino propanol, 2-[2-(Dimethylamino)ethoxy] ethanol, N,N,N'-trimethylaminoethyl ethanolamine, N,N-dimethyl isopropanolamine, N-ethyl-N-(2-hydroxyethyl) aniline, N,N,N'-trimethyl-N'-hydroxyethyl-bisamino ethylether and N,N-bis-(3-dimethylamino-propyl)-N-isopropanolamine, Tris(2-hydroxyethyl)amine.

Alternatively or additionally, the primary amine group and/or the secondary amine group of the polymerization starter compound (i.e. group X in the formula (II)) may function as functional group being used as a starter position for starting a ring-opening addition reaction of a cyclic ether and a cyclic ester for forming the segment i. according to the present invention. When starting the ring-opening addition reaction using the primary amine group or the secondary amine group, each of the primary amine group and the secondary amine group may be converted to a tertiary amine group in case the first added monomer is a cyclic ether. Thus, the polymerization starter compound initially may comprise a primary amine group or a secondary amine group, which functions to start the addition reaction of ether units and ester units, and which is converted to a tertiary amine group as result of the coupling of the polymerization starter moiety to an ether unit. In that case, the tertiary amine group is the link (i.e. X) from the polymerization starter moiety to the adjacent ether unit of the segment i.

Typical examples of polymerization starter compound having a primary amine group or a secondary amine group, which can be converted to the tertiary amine group ii, are monofunctional amines and polyfunctional amines having at least one primary amine group and/or at least one secondary amine group.

In any way, the polymerization starter moiety, when covalently linked to the segment i. in the amine functional compound, contains the tertiary amine group ii.

In an exemplary embodiment, the polymerization starter moiety is linked to said at least one segment via one of the group consisting of an ether group, an ester group, a secondary amide group, a tertiary amide group, a secondary amine group and a tertiary amine group.

In case the functional group of the polymerization starter compound is a hydroxyl group and the first unit is an ether unit, the at least one segment is linked to the polymerization starter moiety via an ether group.

In case the functional group of the polymerization starter compound is a hydroxyl group and the first unit is an ester unit, the at least one segment is linked to the polymerization starter moiety via an ester group.

In case the functional group of the polymerization starter compound is a primary or secondary amine group and the first unit is an ester unit, the at least one segment is linked to the polymerization starter moiety via a secondary amide group or a tertiary amide group.

In case the functional group of the polymerization starter compound is a primary or secondary amine group and the first unit is an ether unit, the at least one segment is linked to the polymerization starter moiety via a secondary amine group or a tertiary amine group.

In a further preferred embodiment of the present invention the corresponding polymerization starter $Y(\text{---}X\text{---}H)_q$ is an amino hydroxy compound with X being represented by 0 and NH and/or NIT and the proviso, that q is 2.

Examples of appropriate amino hydroxy compounds are ethanolamine, propanolamine, iso-propanolamine, 4-aminobutanol, 5-aminopentanol, 6-aminohexanol, 2-(2-aminoethoxy) ethanol, N-methyl ethanolamine, N-ethyl ethanolamine, N-butyl ethanolamine, diethanolamine, 3-((2-hydroxyethyl)-amino)-1-propanol, diisopropanolamine, 2-(2-Aminoethylamino)ethanol and N-(2-hydroxyethyl) aniline.

In one specific embodiment of the present invention the corresponding polymerization starter $Y(\text{---}X\text{---}H)_q$ is an aminic compound with X being represented by NH and/or $NR^1$. The aminic compound $Y(\text{---}X\text{---}H)_q$ used in synthesis of the amine functional compounds according to the invention may contain additional heteroatoms, such as O and/or N and/or ether, amide and/or urea groups. The Y radical may contain additional groups, such as C=C double bonds and/or tertiary amine groups, which are inert in the formation of the amine functional compounds. The ether groups that are optionally present may be present in block structure (for example, polyethylene oxide block-polypropylene oxide block), may form a gradient or may also be arranged randomly.

In one specific embodiment of the invention X is represented by NH and/or $NR^1$, q=1–200, preferably q=2–50 and Y contains 1-250 amino groups. Normally $R^1$ is independently selected and is represented by a chemical bond to a carbon atom of Y and/or an independently selected organic group containing 1-20 carbon atoms.

Examples of appropriate monofunctional amines which can be used as a polymerization starter $Y(\text{---}X\text{---}H)_q$ are for example, aliphatic, cycloaliphatic, aromatic and/or araliphatic amines. Examples therefor are butylamine, hexylamine, 2-ethyl-1-hexylamine, bis(2-ethylhexyl)amine, dibutylamine, diethylamine, dipropylamine, benzylamine, N-benzylmethylamine and N-phenylbenzylamine and cyclohexylamine.

Further examples are saturated and unsaturated primary fatty amines like (hydrogenated) tallow amine, cocos amine, stearyl amine and $C_{16}C_{22}$ alkylamine (available under the brand name Rofamin® types from Ecogreen Oleochemicals GmbH). Saturated and unsaturated primary as well as secondary aliphatic (fatty) amines (available under the brand name Armeen® types from Akzo Nobel Surface Chemistry LLC) may also be used as polymerization starters.

Further examples of appropriate monofunctional amines are polyether monoamines represented by the general formula:

$$R^t\text{—}[OEt]_d[OPr]_e[OBu]_f\text{—}NH_2$$

with $R^t$ an alkyl residue with 1 to 22 carbon atoms, preferably with 1 to 4 carbon atoms. The d [OEt], e [OPr] and f [OBu] units can be arranged in any order. This includes, in particular, a statistical sequence or the arrangement in the form of [OEt], [OPr] and/or [OBu] blocks or an arrangement in the form of a gradient, for example an enrichment or depletion of [OEt] or the others alkoxy units along the polyalkylene oxide chain.

Examples of appropriate polyethermonoamines are JEFFAMINE® M types from Huntsman Corporation (for example JEFFAMINE® M-2070, JEFFAMINE® M-2005, JEFFAMINE® M-600 and JEFFAMINE® M-1000) and Surfonamine® L types and Surfonamine® B types from Huntsman Corporation (for example Surfonamine® L-100, Surfonamine® L-200, Surfonamine® L-207, Surfonamine® L-300, Surfonamine® B-60, Surfonamine® B-100, Surfonamine® B-200). Preferably, d>e>f.

Particular preference is given to f=0 and the ratio of d/e>1, better>2 and even better>3, for example 3 to 50.

Amino functional compounds having tertiary amines may also be used as $Y(\text{—}X\text{—}H)_q$.

Examples of appropriate amino functional compounds having tertiary amines are 2-(diethylamino)ethylamine, 2 (dimethylamino)ethylamine, 3-(dimethylamino)propylamine, 3-(diethylamino)propylamine, bis-(3-dimethylaminopropyl)amine, N-(3-aminopropyl)imidazole, 1-(3-Aminopropyl)-2-methyl-1H-imidazole, 2-(1H-Imidazol-1-yl) ethanamine, 2-(Aminomethyl)pyridine, 4-(Aminomethyl) pyridine and 3-(2-Ethyl-1H-imidazol-1-yl)propan-1-amine, tetramethyliminobispropylamine.

In one specific embodiment of the present invention a polyamine compound can be used as the corresponding polymerization starter $Y(\text{—}X\text{—}H)_q$. Examples of appropriate polyamine compounds are aliphatic linear polyamines, like 1,6-hexamethylendiamine, diethylentriamine (DETA), triethylentetramine (TETA), tetraethylenpentamine (TEPA), pentaethylenhexamine, hexaethylenheptamine and higher molecular homologues, linear condensation products according to the formula $NH_2\text{—}(C_2H_4NH)_n\text{—}C_2H_4\text{—}NH_2$ with n>5, dipropylentriamine, (3-(2-aminoethyl)aminopropylamine, N,N-bis(3-aminopropyl)methylamine, N,N-dimethyldipropylentriamine, and N,N'-bis(3-aminopropyl)-ethylendiamine, Tris(3-aminopropyl) amine, Tris(2-aminoethyl)amine; Further examples are Isophorondiamine, 4,4'-Diamino-diphenylmethane, 1,3- and 1,4-Xylylendiamine, 4,4'-Diaminodicyclohexylmethane, 1,4-Bis(aminomethyl)cyclohexane, 1-piperazineethaneamine, N,N'-bis-(2-aminoethyl) piperazine, N-[(2-aminoethyl) 2-aminoethyl]piperazine, di and/or polyamines based on polyalkylenoxides, examples of appropriate low molecular weight polyethers with amine groups are for example JEFFAMINE® D, ED, EDR, T and SD types from Huntsman Corporation (for example D-230, D-400, D-2000, D-4000, HK-511, ED-600, ED-900, ED-2003, EDR-148, EDR-176, T-403, T-3000, T-5000, SD-231, SD-401, SD-2001, ST-404). Typically aliphatic and branched polyamines, especially poly($C_2$-$C_4$)-alkylenamine, with primary, secondary and tertiary amino groups are used. Further appropriate species are such which are called polyethyleneimines and which are aziridine homopolymers like Lupasol® (BASF SE) or compounds, which are known as Epomin® types (Nippon Shokubai). These compounds are synthesized according to know processes (e.g. polymerization of ethylene imine).

Polyamines having a branched structure and having tertiary amino groups, which are not reactive in connection with the start of the polymerization, allow high molecular structures which do not cause high viscosities.

Generally, a low molecular weight often causes weak adsorption at the particle surfaces, wherein a high molecular weight might cause problems in connection with the handling and the solubility.

In embodiments, the polyamine polymerization starter compound has an $M_n$ average molecular weight of 200-100.000 g/mol, preferred 200-25.000 g/mol, most preferred 200-10.000 g/mol.

In embodiments, the polyamine contains no hydroxyl groups and has a molecular weight of at least 200 and contains at least 4, preferably at least 8 primary or secondary amino groups.

Preferred polyamines contain at least six tertiary amino groups.

In alternative embodiments, the polyamine is modified with an epoxide monomer, such that it contains hydroxyl groups. The modified polyamine can be readily used as polymerization starter compound. The modified polyamine contains less primary amino groups and/or secondary amino groups and contains more hydroxyl groups. The advantage of the modified polyamine is that the resulting amine functional compound contains less amide links to a segment (and more ester links or ether links to a segment), thereby obtaining an amine functional compound having a lower viscosity.

In alternative embodiments, a polyamine may be prepared from an addition reaction of a multi epoxide (such as di epoxides, tri epoxides, tetra epoxides, penta epoxides or hexa epoxides) with compounds having at least one primary amine and oligoamines having at least one primary amine as described above.

Amine Functional Compound

In exemplary embodiments, based on the total weight of the at least one segments and the polymerization moiety, the at least one segments of the amine functional compound is 40-98 wt-%. Preferably, the at least one segments of the amine functional compound is 50-98 wt-%, more preferably, the at least one segments of the amine functional compound is 80-98 wt-%, based on the total weight of the at least one segments and the polymerization moiety.

Postmodification of Terminal Hydroxyl Groups

The amine functional compound according to the invention comprises the polymerisation starter moiety (represented by Y—X in formula (II)) and at least one segment i. Each of the at least one segment i. typically has a terminal hydroxyl group when the segment i. is formed due to the ring-opening polymerization reaction. In embodiments, the terminal OH groups of the segments may be completely or partially postmodificated. For example, one or more of the terminal hydroxyl groups may be converted by an esterification reaction with carboxylic acids, by an acetylation reaction with a non-cyclic acid anhydride or by a monoaddition reaction with (mono)isocyanates.

In another aspect of the present invention a use is provided of an amine functional compound according to the present invention as dispersing agent.

In another aspect of the present invention a use is provided of an amine functional compound according to the present invention as wetting agent.

In another aspect of the present invention a composition is provided comprising particles and an amine functional compound according to the present invention.

The amine functional compound may be contained to function as dispersing agent and/or as wetting agent for the particles.

In an exemplary embodiment, the amount of amine functional compound in the composition is from 0.1-50.0 weight % based on total weight of the composition. Preferably, the amount of amine functional compound in the composition is from 0.1-10.0 weight % based on total weight of the composition. In particular, in case of using the amine functional compound as dispersing agent, said amount enhances the dispersion stability of the particles in the composition.

When using solids that are difficult to stabilize, the amount of wetting agent and dispersant according to the invention may be much higher. The concentration of dispersant needed depends in general on the specific surface area of the solid to be dispersed. Thus, for example, it may be important to know which pigment is involved. Generally, it can be stated that the stabilization of inorganic pigments generally requires less dispersant than is required for stabilizing organic pigments, as the latter tend to have a higher specific surface and therefore require a larger amount of dispersant. Typical doses of the wetting agent and dispersant for inorganic pigments are 1 to 30 wt. %, for organic pigments 10 to 50 wt. %, each based on the solid to be dispersed, in particular the pigment. In case of very finely divided pigments, for example, some carbon blacks, added amounts of 30 to 100% or more are needed.

In an exemplary embodiment, the weight ratio between the particles and the amine functional compound in the composition is in the range 1:1-20:1. In particular, in case of using the amine functional compound as dispersing agent, said amount enhances the dispersion stability of the particles in the composition.

In an exemplary embodiment, the composition further comprises at least one organic binder. The organic binder may be any one resin based on polyurethane, cellulose nitrate, cellulose acetobutyrate, alkyd, melamine, polyester, chlorinated rubber, epoxide, and acrylate.

In another aspect of the present invention a method is provided for producing an amine functional compound according to the present invention, comprising the steps of:
a) preparing a segment by reacting a cyclic ester and a cyclic ether together in a ring-opening polymerization reaction, wherein the ring-opening polymerization reaction is started by a polymerization starter compound, which comprises at least one functional group selected from a hydroxyl group and, a primary amine and a secondary amine group, wherein the polymerization starter compound comprises at least one group selected from an amine group ii, a primary amine group and a secondary amine group.

The polymerization starter compound starts the ring-opening polymerization reaction of the cyclic ester and the cyclic ether, thereby forming the segment. The polymerization starter compound may be monofunctional, suitable for starting a formation of one segment, or may be multifunctional, suitable for start the formation of at least two segments. After the formation of a segment, a covalent link is formed to the segment. As such, a polymerization starter moiety is formed. The polymerization starter moiety includes the molecule structure of the original polymerization starter compound including the formed link to the segment. The link to the segment is determined by the original functional group of the polymerization starter compound (which is selected from a hydroxyl group and, a primary amine and a secondary amine group) and the first unit, which is connected to the polymerization starter moiety. The first unit is one of an ether unit, which is formed from the cyclic ether, and an ester unit, which is formed from the cyclic ester.

In an exemplary embodiment, the molar ratio between the cyclic ester and the cyclic ether in step a) is in the range 19:1 to 1:1. Preferably, the molar ratio between the ester units and the ether units in step a) is in the range 9:1 to 1:1.

In an exemplary embodiment, in step a) the polymerization starter compound comprises a polyethylenimine. The polyethylenimine may be in embodiments may be a modified polyethylenimine comprising a combination of hydroxyl groups and primary amine groups and/or secondary amine groups.

In an exemplary embodiment, in step a) the cyclic ester and the cyclic ether are added substantially simultaneously into a reaction mixture, which is maintained in reaction conditions. The preparing of a segment by reacting a cyclic ester and a cyclic ether together in a ring-opening polymerization reaction may be carried out such that the ether units and ester units of the segment are arranged in random order. In an embodiment, the cyclic ester and the cyclic ether may be mixed together before being brought into reaction conditions. In an example, a mixture of the cyclic ester and the cyclic ether may be controllably, e.g. dropwise, added to a reaction mixture such that the ether units and ester units of the segment are polymerized in random order.

In an exemplary embodiment, in step a) the polymerization starter compound is added to a reaction mixture containing the cyclic ester and the cyclic ether, which reaction mixture is maintained in reaction conditions. In this embodiment, step a) comprises forming a reaction mixture containing the cyclic ester and the cyclic ether, bringing the reaction mixture in reaction conditions, such as suitable temperature and suitable atmosphere for the addition reaction and adding the polymerization starter compound to the reaction mixture. A suitable atmosphere for reaction conditions may be an oxygen free atmosphere.

In an example, the polymerization starter compound is dropwise added in a liquid form to the reaction mixture. The polymerization starter compound may be dissolved in a solvent and the dissolved polymerization starter compound may be dropwise added to the reaction mixture.

Any catalyst that will promote the ring opening polymerization of the described monomers might be used. Representative catalysts include Brönstedt/Lewis acids ($CF_3SO_3CH_3/AlCl_3$, $BF_3$, $ZnCl_2$, rare earth triflates (Sc(OTf)$_3$), guanidines and amidines as for example (1,5,7-triazabicyclo[4.4.0]dec-5-ene (TBD), N-methyl-1,5,7-triazabicyclododecene (MTBD), and 1,8-diazabicyclo[5.4.0]undec-7-ene (DBU), phosphazenes, thiourea-amine, NH-carbenes and enzymes (H. Sardon, A. Pascual, D. Mecerreyes, D. Taton, H. Cramail, J. Hedrick, *Macromolecules* 2015, 48, 3153-3165).

Preferred catalyst types are catalysts, such as dual catalyst systems like $AlCl_3$/DBU, which provide similar reactivities of both the cyclic ester and the cyclic ether. (S. Naumann, P. Scholten, J. Wilson, A. Dove, *J. Am. Chem. Soc.* 2015, 137, 14439-14445).

The catalyst is used in catalytically significant amounts which depends on nature and quantities of reactants, temperature and mixing. Catalyst concentrations of 0.001 to 5 weight percent are typical, with a concentration of 0.01 to 2 weight percent preferred.

A semi batch production in which the more reactive monomer is added during the polymerization reaction might be a further possibility to generate relevant random polymers.

For the characterization of the both types of polymers—block types and random types—different analytical methods could be used for example elementary analysis, $^1$H NMR, $^{13}$C NMR, UV and IR spectroscopy, GPC and DSC. If the glass transition temperatures of the corresponding homopolymers (each based on one relevant monomer type) are sufficiently different, it is possible to distinguish between corresponding homo- and random polymers by means of DSC (differential scanning calorimetry) measurement. An exact description of the analytical methods to distinguish between block and random polymers are described in the literature (*Polymere, Synthese, Eigenschaften and Anwendung, S. Koltzenburg, M. Maskos, O. Nuyken, Springer-Verlag Berlin Heidelberg*, 2014, S. 397-399).

In a particular example, the characterization of the both types of polymers—block types and random types—may be performed by a method comprising the steps of: first hydrolyzing ester links of the at least one segment thereby obtaining sequences of the at least one segment which are free of ester groups. These sequences may have various sequence lengths composed of a number of ether links L between adjacent ether units and optionally including an ether link of an ester unit to an ether unit. The average number length of the sequences of ether units may be determined based on e.g. LC-MS techniques and/or GPC techniques. From these measurements, the average number of ether links L between adjacent ether units may be determined and an average number of ether units E may be determined.

Optionally, the average number of ether links L between adjacent ether units and/or the average number of ether units E may be determined using other techniques like for example with NMR.

In an exemplary embodiment, in step a) the cyclic ether comprises a hydroxyl group. In an example, the cyclic ether is a trimethylolpropane oxetane monomer, which has one hydroxyl group. The functional group of the cyclic ether may additionally react with another cyclic ether or cyclic ester to form an ether unit, which has at least three links to other units of the segment. In this way a branched segment is formed.

In an exemplary embodiment, in step a) the polymerization starter compound is a multifunctional starter for starting at least two ring-opening polymerization reactions per molecule, wherein the at least one functional group of the polymerization starter compound comprises at least one of the group consisting of two hydroxyl groups, two secondary amine groups and a primary amine group. In this embodiment, the polymerization starter compound is multifunctional by starting the forming of at least two chains from the same polymerization starter compound. As such, the multifunctional polymerization starter compound enables that at least two segments are formed during step a) from the same polymerization starter compound.

In another aspect of the present invention an amine functional compound is provided comprising:
i. at least one segment consisting of ether units and ester units, which are connected to one another by an ether link or an ester link, wherein the ether units and the ester units of said at least one segment are arranged in random order; and at least one amine group ii. selected from a tertiary amine group, a salt of a tertiary amine group, and a quaternary ammonium group, wherein the at least one segment is linked to a polymerization starter moiety comprising an amine group ii.

In another aspect of the present invention an amine functional compound is provided obtainable from a method for producing an amine functional compound according to the present invention, wherein the ether units and the ester units of a segment of said at least one segment are arranged in random order, and wherein the amine functional compound comprises at least one amine group ii. selected from a tertiary amine group, a salt of a tertiary amine group, and a quaternary ammonium group, wherein the at least one amine group is covalently linked to the at least one segment, wherein the at least one segment is linked to a polymerization starter moiety comprising an amine group ii.

Application Examples

The amine functional compound of the invention is used in particular in known fields of use of dispersants, as for example in the production or processing of paints and varnishes, of printing inks, of paper coating, of leather colors and textile colors, of pastes, of pigment concentrates, of ceramics or of cosmetic preparations, and especially when these products include solids, such as pigments and/or fillers.

The amine functional compound of the invention can also be used in the production or processing of casting compounds and/or molding compounds based on synthetic, semisynthetic or natural macromolecular substances, such as polyvinyl chloride, saturated or unsaturated polyesters, polyurethanes, polystyrene, polyacrylate, polyamide, epoxy resins, polyolefins, such as polyethylene or polypropylene. Corresponding polymers can be used, for example, for producing casting compounds, PVC plastisols, gelcoats, polymer concrete, printed circuit boards, industrial paints, wood and furniture varnishes, vehicle finishes, marine paints, anticorrosion paints, can coatings and coil coatings, decorating paints, and architectural paints. Examples of customary binders are resins based on polyurethane, cellulose nitrate, cellulose acetobutyrate, alkyd, melamine, polyester, chlorinated rubber, epoxide, and acrylate. Examples of water-based coatings are cathodic or anodic electrodeposition coating systems for automobile bodies, for example. Further examples are renders, silicate paints, emulsion paints, waterborne paints based on water-thinnable alkyds, alkyd emulsions, hybrid systems, 2-component systems, polyurethane dispersions and acrylate dispersions.

The amine functional compounds of the invention are especially suitable also as dispersants for producing solids concentrates, such as pigment concentrates. For this purpose, for example, the amine functional compounds are introduced in a carrier medium, such as organic solvents, plasticizers and/or water, and the solids for dispersal are added with stirring.

These concentrates may additionally comprise binders and/or other auxiliaries. With the amine functional compound of the invention, however, it is possible in particular to produce stable, binder-free pigment concentrates. It is also possible with the polymers to produce flowable solids concentrates from pigment presscakes. In this case, the polymers of the invention are admixed to the presscake, which may still comprise organic solvents, plasticizers and/or water, and the resulting mixture is dispersed. The solids concentrates produced in various ways can then be incorporated into a variety of substrates, such as alkyd resins, polyester resins, acrylate resins, polyurethane resins or epoxy resins, for example. Pigments, however, can also be dispersed solventlessly without a solvent directly into the amine functional compound of the invention and are then suitable especially for pigmenting thermoplastic and thermoset plastic formulations.

The amine functional compound of the invention can also be used advantageously in the production of inks for "non impact" printing processes such as "themal inkjet" and the "bubble jet process". These inks may be, for example, aqueous ink formulations, solvent-based ink formulations, solvent-free or low-solvent inks for UV applications and waxlike inks. The amine functional compound of the invention may also be used advantageously in the production of color filters for liquid-crystal displays. liquid-crystal screens, color resolution devices, sensors, plasma screens, displays based on SED (Surface conduction Electron emitter Display) and for MLCC (Multi Layer Ceramic Compounds). In this case the liquid color filter varnish, also called color resist, can be applied by any of a wide variety of application processes such as spin coating, knife coating, combination of the two or via "non-impact" printing processes such as inkjet processes, for example. The MLCC technology is used in the production of microchips and printed circuit boards.

The amine functional compound of the invention can also be used for producing cosmetic preparations such as, for example, makeup, powder, lipsticks, hair colorants, creams, nail varnishes, and sun protection products. These products may be present in the usual forms, such as W/O or O/W emulsions, solutions, gels, creams, lotions or sprays, for example. The polymers of the invention can be used advantageously in dispersions that are used for producing these preparations. These dispersions may comprise the carrier media that are customary in cosmetology for these purposes, such as water, castor oils or silicone oils and solids, examples being organic and inorganic pigments, such as titanium dioxide or iron oxide.

A dispersant of this kind may also be used, lastly, for producing a pigmented coating on a substrate, in which case the pigmented paint is applied to the substrate and the pigmented paint applied to the substrate is dried, baked or cured, or crosslinked.

The amine functional compound of the invention can be used alone or together with customary binders. In the case of use in polyolefins, it may be advantageous, for example, to use corresponding low molecular weight polyolefins as carrier materials together with an amine functional compound.

Another possible use of the amine functional compound of the invention lies in the production of dispersible solids in powder particle and/or fiber particle form, more particularly of dispersible pigments or polymeric fillers, in which case the particles are coated with an amine functional compound. Coatings of this kind of organic and inorganic solids are performed in a known way. The solvent or emulsion medium in this case may either be removed or may remain in the mixture, to form pastes. These pastes are customary commercial products and may additionally comprise binder fractions and also further auxiliaries and adjuvants. Especially in the case of pigments, the coating of the pigment surface may take place during or after the synthesis of the pigments, by addition of an amine functional compound the pigment suspension, for example, or during or after pigment conditioning. The pigments pretreated in this way are notable for greater ease of incorporation and also for improved viscosity, flocculation, and gloss characteristics, and for greater color strength by comparison with untreated pigments.

Examples of pigments are mono-, di-, tri- and polyazo pigments, oxazine, dioxazine and thiazine pigments, diketopyrrolopyrroles, phthalocyanines, ultramarine and other metal complex pigments, indigoid pigments, diphenylmethane, triarylmethane, xanthenes, acridine, quinacridone, methine pigments, anthraquinone, pyranthrone, perylene and other polycyclic carbonyl pigments. Further examples of organic pigments are found in the following monograph: W. Herbst, K. Hunger "Industrial Organic Pigments", 1997 (publisher: Wiley-VCH, ISBN: 3-527-288368). Examples of inorganic pigments are pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (examples being nickel titanium yellow, bismuth vanadate molybdate yellow, or chromium titanium yellow). Further examples are cited in the following monograph: G. Buxbaum, "Industrial Inorganic Pigments", 1998 (publisher: Wiley-VCH, ISBN: 3-527-28878-3). Inorganic pigments may also be magnetic pigments based on pure iron, iron oxides and chromium oxides or mixed oxides, metallic effect pigments composed of aluminum, zinc, copper or brass and pearlescent pigments, fluorescent and phosphorescent luminous pigments. Further examples are nanoscale organic or inorganic solids with particle sizes of below 100 nm, such as particular types of carbon black or particles consisting of a metal or a semimetal oxide and/or hydroxide and also particles which consist of mixed metal and/or semimetal oxides and/or hydroxides. For example, the oxides and/or oxide hydroxides of aluminum, of silicon, of zinc, of titanium, etc., can be employed for producing extremely finely divided solids of this kind. The process by which these oxidic and/or hydroxidic and/or oxide-hydroxidic particles are produced may take place via any of a wide variety of methods such as, for example, ion exchange operations, plasma operations, sol-gel processes, precipitation, comminution (by grinding, for example) or flame hydrolysis, etc. These nanoscale solids may also be what are called hybrid particles, consisting of an inorganic core and an organic shell or vice versa. Examples of fillers in powder or fiber form are, for example, those, which are constructed from particles in powder or fiber form of aluminum oxide, aluminum hydroxide, silicon dioxide, kieselguhr, siliceous earth, quartz. silica gel, talc, kaolin, mica, perlite, feldspar, finely ground slate, calcium sulfate, barium sulfate, calcium carbonate, calcite, dolomite, glass, polyvinylidene fluoride (PVDF) or carbon. Further examples of pigments or fillers are found, for example, in EP-A-0 270 126. Flame retardants as well, such as aluminum or magnesium hydroxide, and matting agents such as silicas, for example, are likewise amenable to effective dispersal and stabilization.

The amine functional compound of the invention, moreover, can also be used as emulsifier, phase mediator (liquid/liquid compatibilizer) or adhesion promoter.

The invention is elucidated in more detail below by means of working examples.

EXAMPLES

General Remarks

In the case of substances without molecular uniformity the stated molecular weights—below as already in the foregoing description—represent average values of the numerical mean. The molecular weights or number-average molecular weights $M_n$, are determined, when titratable hydroxyl or amino groups are present, by end-group determination via the determination of the OH number or amine number, respectively. In the case of compounds to which an end-group determination cannot be applied, the number-average molecular weight is determined by means of gel permeation chromatography against a polystyrene standard. Unless otherwise remarked percentages are percentages by weight.

Measurement of Non-Volatile Components

The sample (2.0±0.1 g of the tested substance) was weighed in a previously dried aluminum crucible and dried in furnace for 20 minutes at 150° C., cooled in a desiccator and then reweighed. The residue corresponds to the solids content in the sample (ISO 3251).

Measurement of Acid Numbers

The acid number is the KOH quantity in mg that is required for neutralizing 1 g of substance under the defined conditions. The acid numbers were determined by a neutralization reaction with a 0.1 N KOH in Ethanol according to DIN EN ISO 2114.

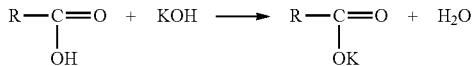

Measurement of Hydroxyl Numbers

The alcoholic hydroxyl groups were reacted by acetylation with an excess of acetic anhydride. The excess acetic anhydride was cracked into acetic acid by adding water and titrated back using ethanolic KOH. The hydroxyl number was understood to be the KOH quantity in mg, which is equivalent to the acetic acid quantity bound when acetylating 1 g of substance (according to DIN ISO 4629)

Measurement of Amine Numbers

Perchloric acid ($HClO_4$) in acetic acid has proved to be a suitable titration agent for organic bases containing nitrogen as well as primary, secondary and tertiary amine groups. Acid solvents such as acetic acid have stood the test in determining weak organic bases (good dissolving properties, proton-donating acid solvent). Additions of inert solvents such as cyclohexane, dioxane, chlorobenzene, acetone and methyl ethyl ketone can improve the titration of very weak bases (according to DIN 16945).

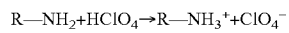

NMR Measurements

The NMR measurements were carried out on a Bruker DPX 300 at 300 MHZ ($^1H$) or 75 MHZ ($^{13}C$). Solvents used were deuterated chloroform ($CDCl_3$) and deuterated dimethyl sulfoxide (DMSO-$d_6$).

Preparation of the Intermediate Products: First Step

Examples According to the Invention

Preparation Method 1

A clean dry four-necked flask (500 mL) equipped with reflux condenser, KPG-stirrer, temperature sensor and a nitrogen line was charged with a mixture of the lactone and the epoxide and heated up to 80° C. Then a polymerization starter was slowly added into this mixture. After complete addition the mixture was heated up to 140° C. and stirred for 2 h. Then the reaction mixture was cooled down to 40° C., the catalysts were added and the temperature was increased up to 140° C. The incorporation of epoxide and the lactone monomers was determined by the means of NMR.

TABLE 1

Intermediate products prepared according to the method 1

| Example | Polymerization starter | wt. % lactone | | wt. % epoxide | | wt. % catalyst | | wt. % |
|---|---|---|---|---|---|---|---|---|
| A1 | PEI300 | 3.72 | CAPA | 55.88 | 2-EHGE | 39.45 | AlCl₃/DBN | 0.80/0.15 |
| A2 | PEI300 | 1.23 | CAPA | 53.60 | 2-EHGE | 44.22 | AlCl₃/DBN | 0.80/0.15 |
| A3 | PEI300 | 8.12 | VAL | 61.88 | 2-EHGE | 29.05 | AlCl₃/DBN | 0.80/0.15 |
| A4 | PEI300 | 3.91 | VAL | 67.13 | 2-EHGE | 28.01 | AlCl₃/DBN | 0.80/0.15 |
| A5 | PEI300 | 4.41 | CAPA | 67.10 | CGE | 27.54 | AlCl₃/DBN | 0.80/0.15 |
| A6 | PEI300 | 6.51 | CAPA | 56.63 | C12-C14-AlkylGE | 35.91 | AlCl₃/DBN | 0.80/0.15 |
| A7 | PEI300 | 3.02 | CAPA | 46.01 | C12-C14-AlkylGE | 50.02 | AlCl₃/DBN | 0.80/0.15 |
| A8 | PEI 1300 | 7.46 | CAPA | 64.88 | 2-EHGE | 26.71 | AlCl₃/DBN | 0.80/0.15 |
| A9 | PEI 1300 | 4.33 | CAPA | 47.02 | C12-C14-AlkylGE | 47.70 | AlCl₃/DBN | 0.80/0.15 |
| A10 | PEI 1300 | 6.61 | CAPA | 71.80 | CGE | 20.64 | AlCl₃/DBN | 0.80/0.15 |
| A11 | PEI 2000 | 4.67 | CAPA | 60.93 | 2-EHGE | 33.45 | AlCl₃/DBN | 0.80/0.15 |
| A12 | PEI 2000 | 5.70 | CAPA | 61.94 | C12-C14-AlkylGE | 31.42 | AlCl₃/DBN | 0.80/0.15 |
| A13 | PEI 2000 | 9.30 | CAPA | 60.68 | CGE | 29.07 | AlCl₃/DBN | 0.80/0.15 |
| A14 | PEI 2000 | 3.67 | CAPA | 55.91 | 2-EHGE | 39.47 | AlCl₃/DBN | 0.80/0.15 |

PEI (number) = polyethylenimine (molecular weight),
VAL = delta-Valerolactone,
CAPA = ε-Caprolactone,
2-EHGE = 2-ethylhexyl glycidyl ether,
CGE = o-cresyl glycidyl ether,
C12-C14-AlkylGE = C12-C14 alkyl glycidyl ether,
DBN = 1,5-Diazabicyclo(4.3.0)non-5-ene,
AlCl₃ = aluminum trichloride.

Preparation of Comparative Intermediate Products: First Step

Preparation Method 2

A clean dry four-necked flask (500 mL) equipped with reflux condenser, KPG-stirrer, temperature sensor and a nitrogen line was charged with the epoxide and heated up to 80° C. Then a polymerization starter was slowly added into this mixture. After complete addition the temperature was increased up to 140° C. and the mixture was stirred for 2 h. Then the reaction mixture was cooled down to 40° C., the catalysts were added and the temperature was increased up to 140° C. The reaction mixture was stirred at this temperature until the epoxide was completely reacted (controlled by the means of NMR). Then the lactone was slowly added at 140° C. The incorporation of epoxide and the lactone monomers was determined by the means of NMR.

TABLE 2

Intermediate products prepared according to the method 2

| Example | polymerization starter | wt. % | lactone | wt. % | epoxide | wt. % | catalyst | wt. % |
|---|---|---|---|---|---|---|---|---|
| B1* | PEI300 | 3.72 | CAPA | 55.88 | 2-EHGE | 39.45 | AlCl$_3$/DBN | 0.80/0.15 |
| B2* | PEI300 | 1.23 | CAPA | 53.60 | 2-EHGE | 44.22 | AlCl$_3$/DBN | 0.80/0.15 |

PEI (number) = polyethylenimine (molecular weight),
CAPA = ε-Caprolactone,
2-EHGE = 2-ethylhexyl glycidyl ether,
DBN = 1,5-Diazabicyclo(4.3.0)non-5-ene,
AlCl$_3$ = aluminum trichloride

Preparation of the products: second step

Comparative samples are marked with (*).

Preparation Method 3

A clean dry four-necked flask (500 mL) equipped with reflux condenser, KPG-stirrer, temperature sensor and a nitrogen line was charged with the intermediate product and tall oil fatty acid and heated up to 50° C. The reaction mixture was stirred at that temperature for 2 h.

After that, the acid value and the amine value are determined.

TABLE 3

Intermediate products prepared according to the method 3

| Example | Intermediate products | Post wt. % modification | | sol- wt. % vent | Active substance |
|---|---|---|---|---|---|
| L1* | B1* | 97.71 | TÖF | 2.29 — | 100 |
| L2 | A1 | 98.20 | TÖF | 1.80 — | 100 |
| L3* | B2* | 99.16 | TÖF | 0.84 — | 100 |
| L4 | A2 | 99.39 | TÖF | 0.61 — | 100 |

TÖF = tall oil fatty acid

Application Examples

Samples marked with (*) are comparative examples.

Application Example 1

Samples marked with (*) are comparative examples.

Working Method 1

During the application test additive L2 was compared with L1* and additive L4 with L3*.

Raw Material Used for the Application Tests

Ebecryl 4381: UV/EB Curable Resins-unsaturated polyester resin diluted in 30% dipropylene glycol diacrylate (DPGDA), purchased from Allnex Laromer DPGDA: Dipropylene glycol diacrylate, purchased from BASF Irgacure 1173: 2-Hydroxy-2-methyl-1-phenyl-propan-1-one used in reactive and radiation curing adhesives, purchased from IGM ACEMATT HK 440: Untreated silica-based matting agent, purchased from Evonik BYK-088: Defoamer for solvent-borne systems, purchased from BYK Chemie GmbH BYK-306: Silicone-containing surface additive for ambient-curing plastic systems and solvent-borne coating systems, purchased from BYK Chemie GmbH BYK-350: An acrylic leveling additive for solvent-borne and solvent-free systems, purchased from BYK Chemie GmbH

Preparation of UV Matt Base

In order to achieve a high quality UV matt base, a sufficient wetting and dispersing of the matting agent is important. The following properties indicate the effect of the additives used: gloss reduction (preferable low gloss), surface appearance (preferable smooth and fine) and coating viscosity (preferable low/flowable).

The detailed composition of the formulation is presented in the table 4.

TABLE 4

| | Composition of the formulation | |
|---|---|---|
| Position | Raw Materials | Composition [wt %] |
| 1 | Ebecryl 4381 | 30.2 |
| 2 | Laromer DPGDA | 46.5 |
| 3 | Irgacure 1173 | 5.0 |
| 4 | BYK-088 | 0.4 |
| 5 | BYK-306 | 0.2 |
| 6 | BYK-350 | 0.2 |
| 7 | Laromer DPGDA | 1.0 |
| 8 | W&D-Additive | 1.5 |
| 9 | ACEMATT HK 440 | 15 |
| total | | 100.0 |

First raw materials listed in the position 1-3 were mixed shortly by dissolver (1865 rpm) for the preparation of the UV matt base. Then the additives listed in the positions 4-7 were added to this mixture and stirred for another 3 minutes at 1865 rpm. Subsequently the W&D additive (position 8) was added to the mixture under stirring. Finally, a matting agent (position 9) was added and the whole mixture was stirred for 10 minutes at 1865 rpm.

The final coatings were applied on black PMMA (poly methyl methacrylate) panels and cured using mercury UV lamp from IST Metz GmbH (speed 5 m/min, 100% intensity).

The results of the application tests are presented below.
Results

In the tested coating system the additives L2 and L4 lead to better viscosity reduction compared to corresponding samples L1* and L3* and enable the formulation of higher loaded coatings (coatings which contain 15-20 wt % of matting agent). The low viscosity supports application with a roller coater and improves leveling and orientation of the matting agents in the final coating. Appearance and haptic of coatings prepared with L2 and L4 are very smooth and fine and offer the sensation of high-quality surfaces, as shown in Table 6.

TABLE 5

Results of the viscosity measurement
L2 and L4 lead to lower coating viscosity compared
to the comparative samples L1* and L3*.

| | sample | | | |
|---|---|---|---|---|
| Shear rate 1/s | L1* Viscosity mPa s | L2 Viscosity mPa s | L3* Viscosity mPa s | L4 Viscosity mPa s |
| 1 | 83 | 50 | 46 | 38 |
| 10 | 10 | 5 | 14 | 5 |

TABLE 6

Coating surface appearance
L2 and L4 lead to a significant better surface
appearance compared to L1* and L3*.

| | Surface appearance |
|---|---|
| L1* | rough, coarse |
| L2 | smooth, fine |
| L3* | rough, coarse |
| L4 | smooth, fine |

The invention claimed is:

1. An ink or coating composition comprising pigment particles and an amine functional compound comprising
   i. at least one segment comprising at least one ether unit and at least one ester unit, wherein the at least one ether unit and the at least one ester unit are connected by an ether link or by an ester link, and wherein the sum of the number of the at least one ether unit and the at least one ester unit is at least three, and wherein the at least one ether unit and the at least one ester unit are arranged in random order, and
   ii. at least one amine group ii. selected from a tertiary amine group, a salt of a tertiary amine group and a quaternary ammonium group,
   wherein the at least one segment is covalently linked to a polymerization starter moiety comprising the at least one amine group ii.

2. The composition according to claim 1, wherein the polymerization starter moiety is directly linked to said at least one segment via one or more selected from an ether group, an ester group, a secondary amide group, a tertiary amide group, a secondary amine group and a tertiary amine group.

3. The composition according to claim 1, wherein the polymerization starter moiety comprises a polyethylenimine.

4. The composition according to claim 1, wherein the at least one ether unit includes a unit of formula (IV) —[CR$^{30}_2$]$_n$—O—, wherein n is an integer of 2 or 3, and R$^{30}$ independently of each other represent organic groups having 1 to 25 carbon atoms or hydrogen.

5. The composition according to claim 1, wherein the at least one segment has a molar ratio between the at least one ether unit and the at least one ester unit in the range 19:1 to 1:1.

6. A composition comprising pigment particles and an amine functional compound, the amine functional compound being included in an amount ranging from 1 to 50 wt. % based on the weight of the pigment, the amine functional compound comprising
   i. at least one segment comprising at least one ether unit and at least one ester unit, wherein the at least one ether unit and the at least one ester unit are connected by an ether link or by an ester link, and wherein the sum of the number of the at least one ether unit and the at least one ester unit is at least three, and wherein the at least one ether unit and the at least one ester unit are arranged in random order,
   ii. at least one amine group ii. selected from a tertiary amine group, a salt of a tertiary amine group and a quaternary ammonium group,
   wherein the at least one segment is covalently linked to a polymerization starter moiety comprising the at least one amine group ii.

7. The composition according to claim 6, wherein the polymerization starter moiety is directly linked to said at least one segment via one or more selected from an ether group, an ester group, a secondary amide group, a tertiary amide group, a secondary amine group and a tertiary amine group.

8. The composition according to claim 6, wherein the polymerization starter moiety comprises a polyethylenimine.

9. The composition according to claim 6, wherein the at least one ether unit includes a unit of formula (IV) —[CR$^{30}_2$]$_n$—O—, wherein n is an integer of 2 or 3, and R$^{30}$ independently of each other represent organic groups having 1 to 25 carbon atoms or hydrogen.

10. The composition according to claim 6, wherein the at least one segment has a molar ratio between the at least one ether unit and the at least one ester unit in the range 19:1 to 1:1.

* * * * *